Feb. 4, 1969        F. PEDLEY        3,426,171
WELDING OF HOLLOW COMPONENTS
Filed Aug. 23, 1965        Sheet 6 of 6

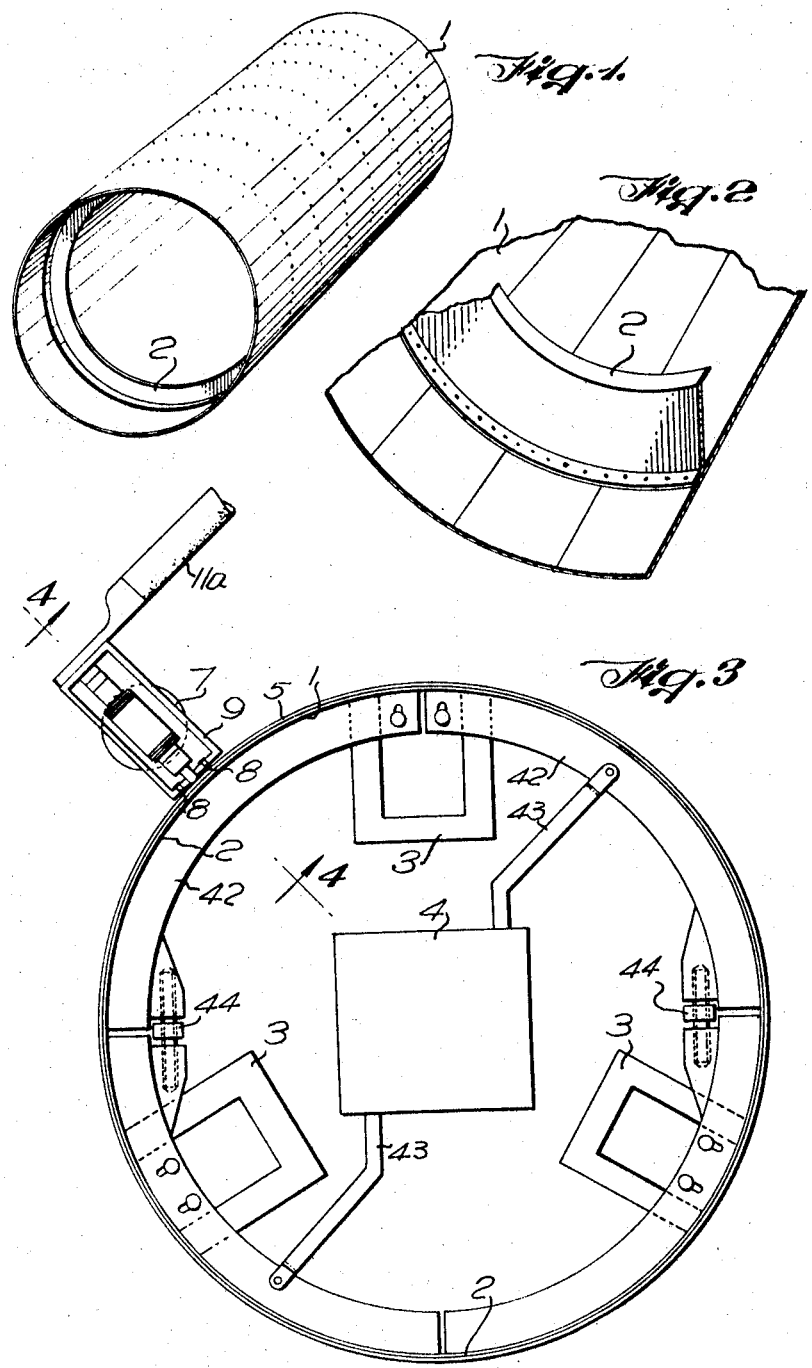

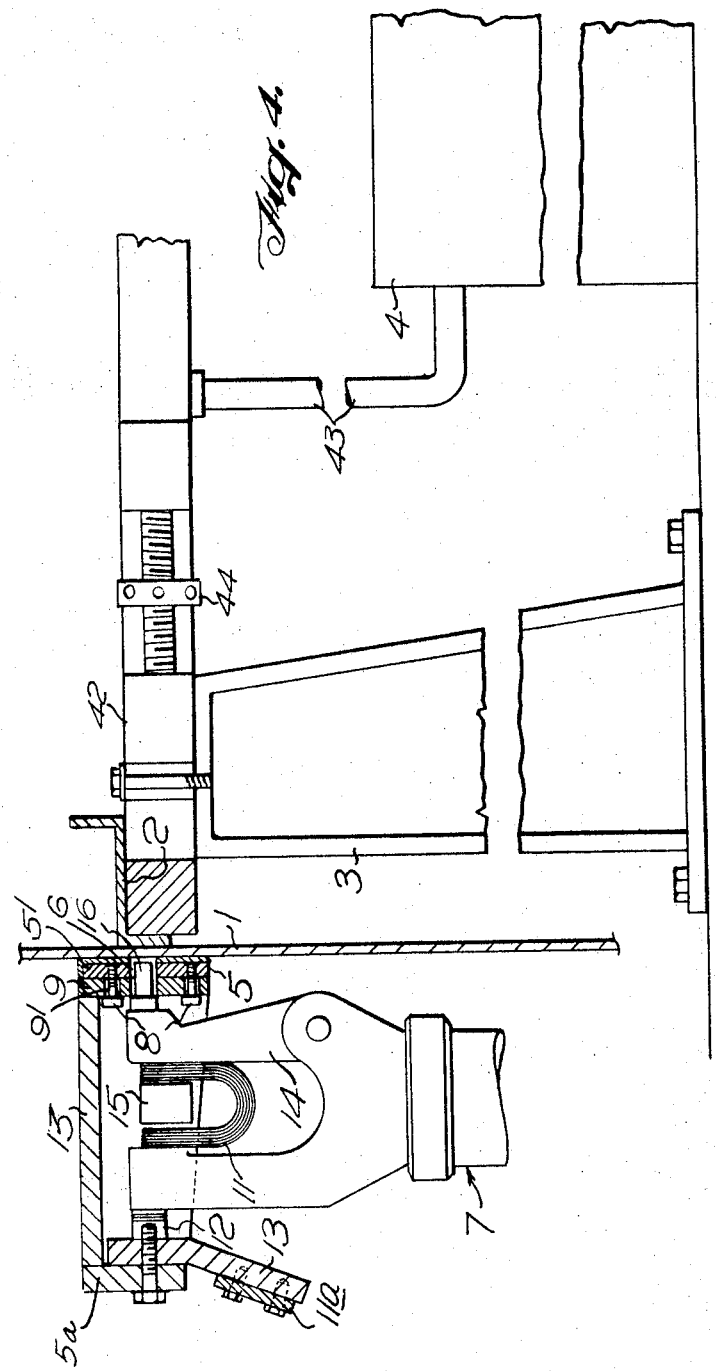

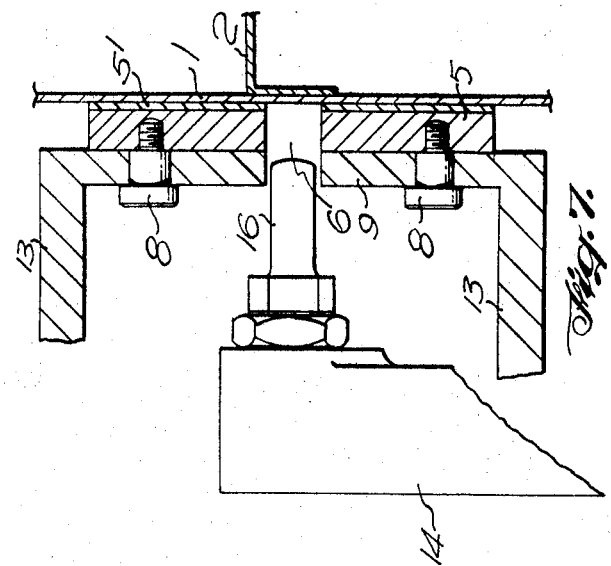
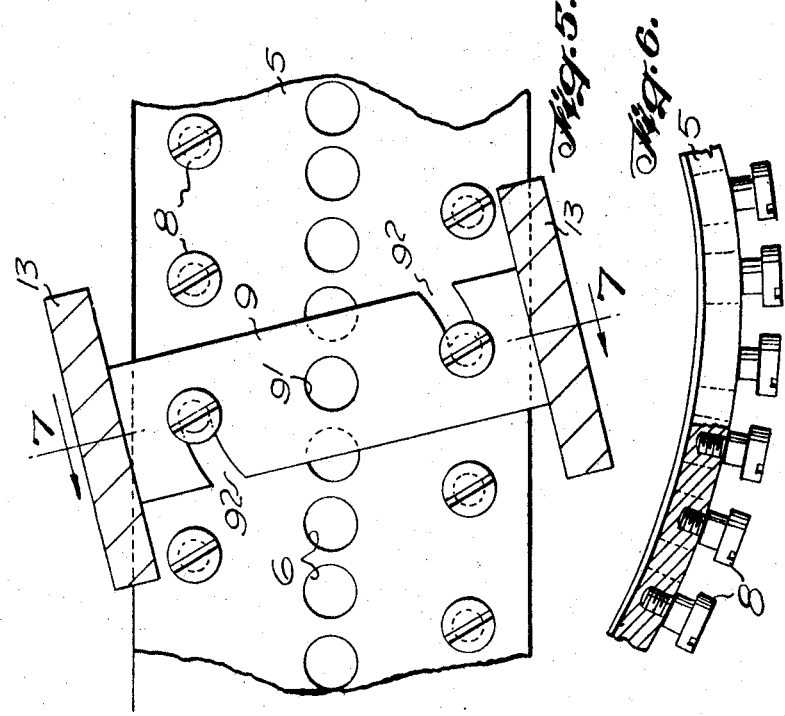

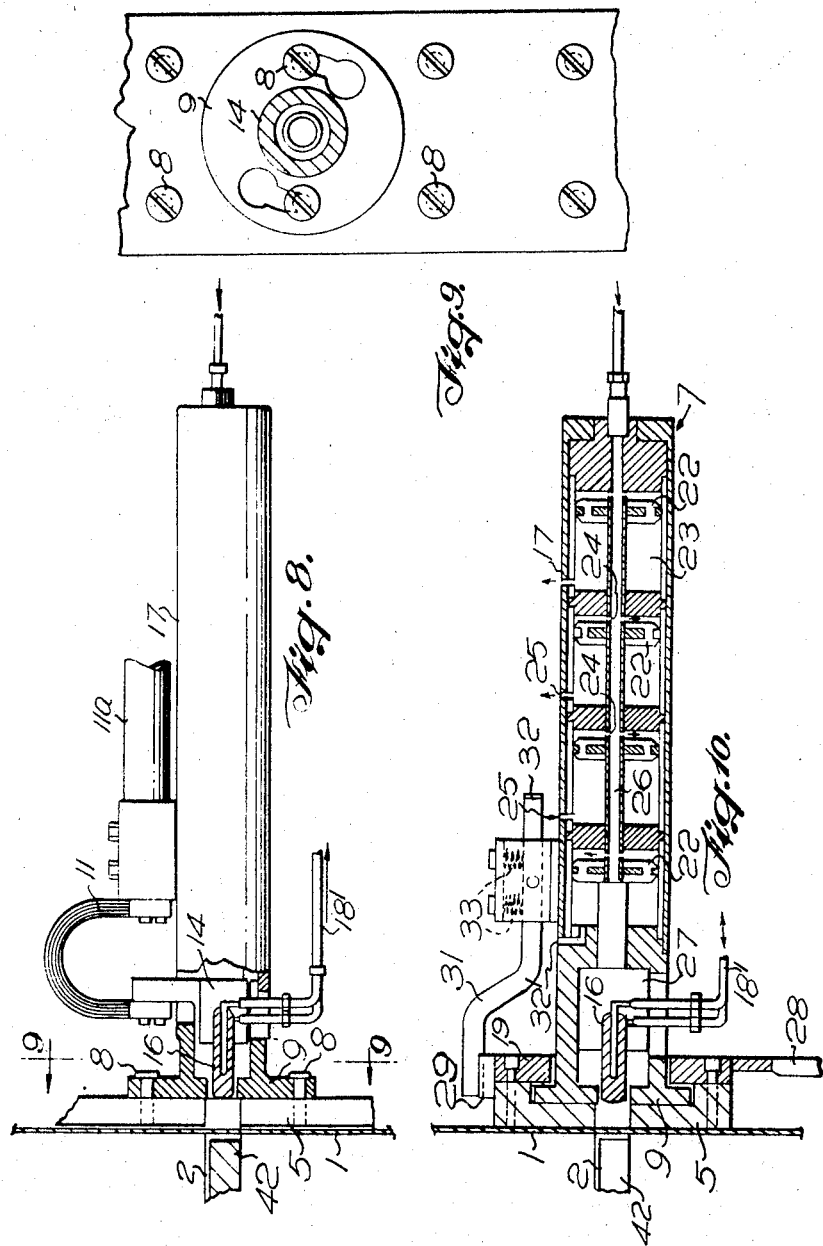

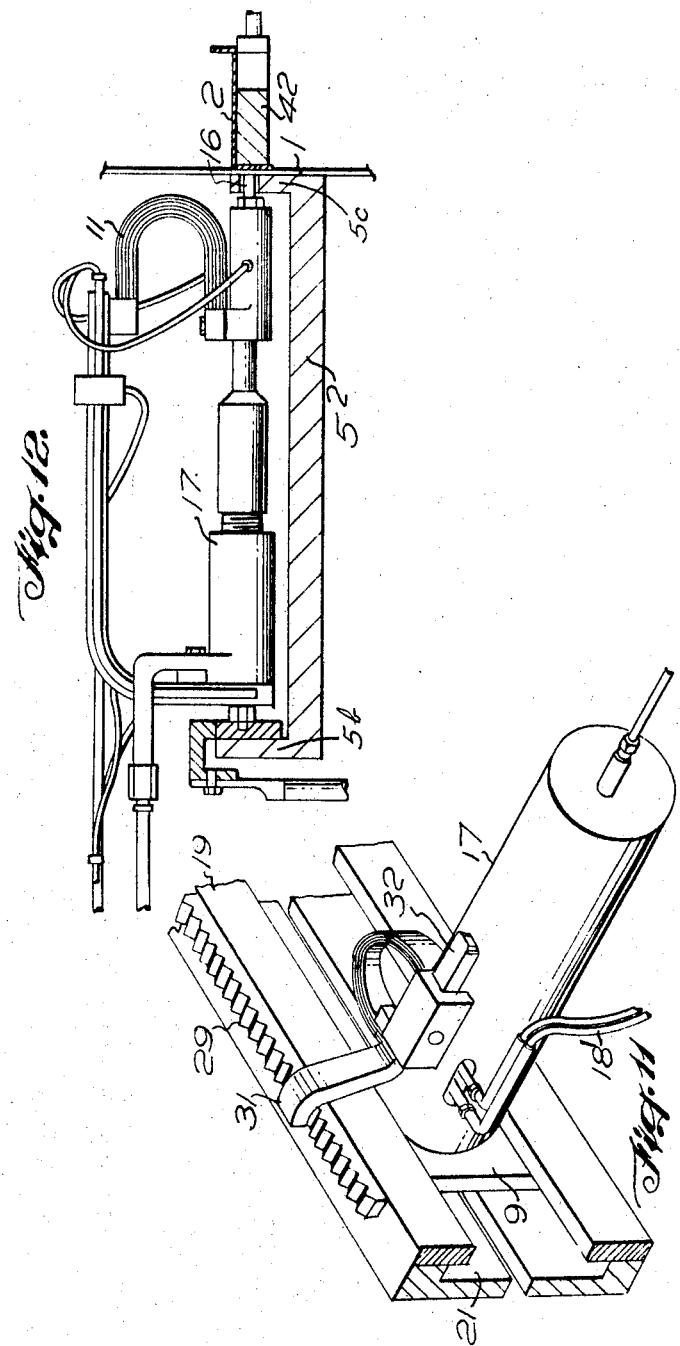

INVENTOR:
FRED PEDLEY
BY
Norris & Bateman
ATTORNEYS

United States Patent Office 3,426,171
Patented Feb. 4, 1969

3,426,171
WELDING OF HOLLOW COMPONENTS
Fred Pedley, The Grange, Birch, Middleton, England
Filed Aug. 23, 1965, Ser. No. 481,498
U.S. Cl. 219—78                                   6 Claims
Int. Cl. B23k 11/02

ABSTRACT OF THE DISCLOSURE

Apparatus for welding a member within a hollow component while the member is clamped interiorly thereof at a weld station. A band surrounds the outer surface of the component and is readily movable therealong to enable several members to be welded thereto at different weld stations. The band includes means to support and position a welding gun at a number of positions around the band and hollow component at each weld station to provide a ring of welds therearound.

---

Figure 13:
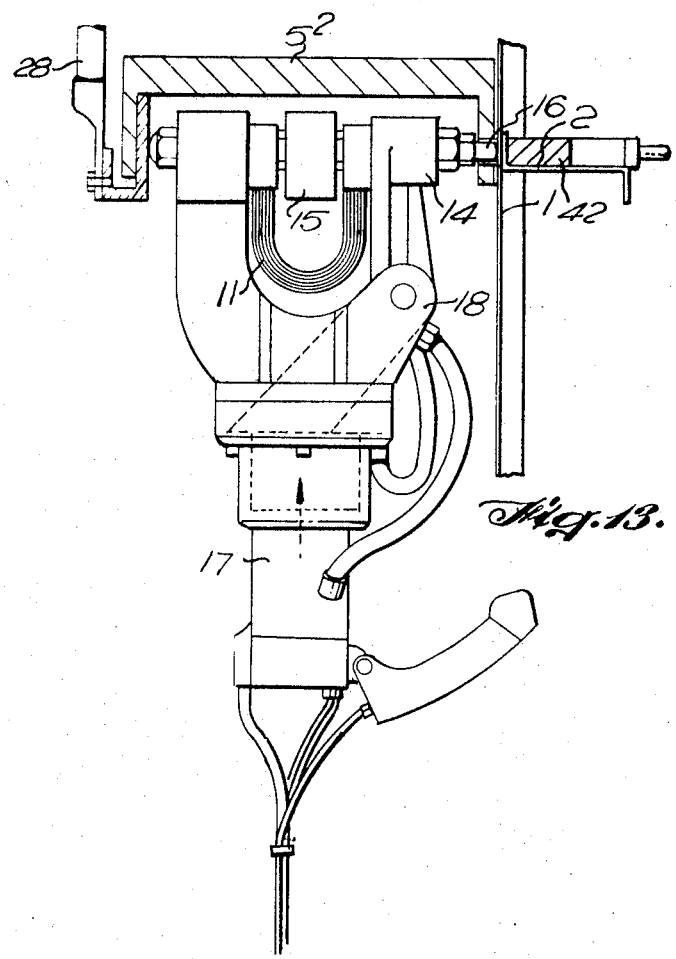

This invention relates to improvements in welding hollow components.

In the specification of Patent No. 3,197,607 there is described a method and apparatus for welding a hollow component to a second component comprising enclosing the hollow component in a rigid jig or former shaped to the outer contour of the component, internally clamping a second component to the first component and applying a welding gun to the jig or former at a predetermined position or positions to weld the two components together.

It has been found that the rigid jig or former enclosing the hollow component may be dispensed with and substituted by a band provided with a plurality of studs or a channel member for supporting a welding gun to take the reaction during the welding operation, the band being moved from station to station to effect the welds.

According to the invention a hollow first component to be welded to a second component or components is surrounded by a band positioned in turn at predetermined stations for supporting a welding gun and the second component is clamped to the side of the first component remote from the gun at each station by a jig acting as a stationary electrode, the band being advanced from station to station along the first component after each ring of welds has been completed.

The invention will be described with reference to the accompanying drawings:

FIG. 1 is a perspective view of the welded components.
FIG. 2 is an enlarged detail view of part of FIG. 1.
FIG. 3 is an end view of the components showing a welding gun and the ring in position.
FIG. 4 is an enlarged section on line 4—4 FIG 3.
FIG. 5 is a plan of part of a band showing pilot holes or apertures for one jaw of a welding gun.
FIG. 6 is a side elevation partly in section of FIG. 5.
FIG. 7 is a section on line 7—7 FIG. 5.
FIG. 8 is a vertical section of a welding gun.
FIG. 9 is a section on line 9—9 FIG. 8.
FIG. 10 is a similar section showing a further gun.
FIG. 11 is a perspective view of a bus bar ring.
FIG. 12 is a vertical section of a fluid actuated welding gun.
FIG. 13 is a similar view of a further arrangement.

A hollow first component 1 and a second component 2 to be welded together are provided with an internal reinforcement at each welding station comprising an outwardly expanding divided ring 42 carried by pedestal jig supports 3 mounted on a floor. The ring 42 forms a fixed electrode connected by leads 43 to the end of the secondary winding of a transformer 4, the contour of the ring conforming to the contour of the first component. The ring 42 is expanded outwards to clamp the second component 2 by left and right handed screws 44.

The ring 42 may be expanded outwards hydraulically, pneumatically or mechanically at each station to engage the interior contour of the component 2 to support the welding pressure.

A component 2 to be welded to the hollow component 1 is mounted internally thereof at each station and clamped by a ring 42. The rings 42 may be positioned prior to the welding operation or a ring 42 may be advanced from station to station after each ring of welds at one station have been completed.

With large components a number of guns may be operated simultaneously at each station thereby speeding up the operation.

The welds at each station may be arranged to overlap to produce a fluid tight joint between the components.

A band 5 conforming to the shape of the first component 1 such as an aircraft fuselage or wing or ether vessel, is applied to the outside thereof, the band forming a location member for a welding gun 7, a plurality of pilot holes or apertures being provided in the band opposite each weld position to receive an electrode on the gun. Current is supplied to the gun through a lead 11a from the opposite end of the secondary winding on the transformer 4.

As shown in FIGS. 5 and 6 the band 5 is formed with a plurality of pilot holes or apertures 6 to receive the electrode 16 of the welding gun 7 for each weld, a plurality of studs 8 being inserted in the band 5 for engagement in pairs by a slotted location plate 9 on the gun 7. In an alternative from shown in FIGS. 12 and 13 the band 5 is of channel section for stiffening purposes where the component is formed with a re-entry portion and the gun is positioned between the flanges of the channel.

The ends of the band may be connected by toggle mechanism (not shown) for clamping it in position at each station. The band is advanced from station to station after welding after each ring of welds has been completed.

Alternatively channel members 19 (FIGS. 10 and 11) are affixed to the band 5 to provide a slide for the plate 9 on the gun.

The gun 7 is formed with two jaws pivoted together (FIG. 4) to expand outwards and connected by a flexible copper laminated connecting member 11 to which current is supplied by a lead 11a. One jaw 12 is bolted to one flange 5a of a gun reaction box 13 of channel section formed by the band 5 the plate 9 forming the second flange (FIG. 4), or the plate 9 (FIGS. 5–7) may be formed integral with the box 13.

The second jaw 14 carries the electrode 16 which extends through hole $9^1$ in the plate 9 (FIG. 4) and into the appropriate hole 6 in the band 5. The plate 9 is located in position by slots $9^2$ therein (FIG. 5) engaging under a pair of studs 8 in the band 5 which take the reaction pressure exerted by the gun on each welding operation. The studs 8 are so positioned on the band that the second jaw 14 of the gun is automatically located centrally of the pilot hole or aperture 6 in the band for each weld, with the electrode 16 extending through the pilot hole 6. The studs may be staggered so that one stud of each pair may be employed for successive welds. A block 15 may be provided between the jaws 12, 14 as described in the prior U.S. Patent No. 3,197,607.

The slotted plate 9 may have the slots extending inwards from the same side of the plate or from opposite sides to engage the studs 8.

As shown in FIGS. 4 and 7 a strip of insulating material $5^1$ may be provided between the band 5 and the component 1 and the strip may extend over one end of the plate 9 (FIG. 4).

In the construction shown in FIGS. 8 and 9 the electrode 16 is water cooled through pipes 18¹ current being supplied to the connecting member 11 by the lead 11a. The plate 9 is carried by a cylinder 17 by which the welding pressure is applied to the jaw 14.

In the arrangement shown in FIGS. 10 and 11 a bus bar 19 preferably of solid copper is bolted to the band 5 and supplies current to the electrode 16 the gun being connected to slide in grooves 21 to the sides of which as welding pressure is applied by the cylinder 17 the plate 9 is pressed to make a good contact with the bus bar. The bus bar may be straight or curved according to the contour of the hollow container.

The gun 7 is operated by compressed air acting on pistons 22 in the cylinder 17, the air entering each chamber 23 through ports 24 and being exhausted through ports 25. The pistons are keyed to a push rod 26. The push rod 26 engages an electrode holder 27 to move the electrode 16 into contact with the component 1.

A lead from the secondary of the transformer 4 is connected to a terminal block 28 on the bus bar ring 19 affixed to the ring 5 which also carries a rack 29 engaged by an indexing head 31 pivoted on the cylinder 17 and actuated by a hand lever 32 against the action of springs 33 for the movement of the gun by one or more teeth after each welding operation.

The component is prevented from buckling by the ring 42 which clamps the component 2 to the opposite side of the component 1 and the components are thus firmly held against the electrode 16 for the welding operation. The back pressure operates a pressure switch (not shown) which closes the welding circuit. The circuit is broken by a time switch and the electrode is returned by air entering the cylinder through a port 32¹. The gun is then moved to the next welding position by the indexing head 31 either manually as described or automatically.

In the arrangements shown in FIG. 12 the cylinder 17 is mounted in a band 5² of channel section, having end flanges 5b and 5c, the electrode 16 being water cooled similarly to the construction shown in FIG. 8. The channel section band renders the plate 9 unnecessary.

A similar band 5² is shown in FIG. 13 the gun 7 being the same as shown in FIG. 4 but provided with a cylinder 17 operating an arm 18 connected to the jaw 14 to apply the welding pressure.

The adjacent or interfaces of the components may be painted prior to welding wth a corrosion inhibiter such as that sold under the trademark Redux.

What I claim is:

1. Apparatus for welding at least one member to a hollow component comprising means for clamping said member within said component with the regions of said member to be welded to said component extending in surface contact with the interior of said component around a weld station, said clamping means including stationary electrode means contacting said member, welding gun means including an electrode cooperating with said stationary electrode to perform a welding operation, a band surrounding said hollow component at said weld station and being movable along said component from said weld station to other weld stations, said band including means for positioning said welding gun means adjacent the outer surface of said hollow component at a plurality of positions aroud said band and component, thereby enabling a ring of welds to be formed at each weld station.

2. Apparatus as in claim 1 in which said band is provided with a plurality of pairs of studs having heads extending above the surface of said band, said welding gun means having a plate engaging said studs and an aperture for passage of said gun electrode therethrough.

3. Apparatus as in claim 1 in which a bus bar is affixed to the band for supplying current to the welding gun.

4. Apparatus as in claim 1 in which the band is formed of channel section, the gun means being mounted between the flanges of the channel.

5. Apparatus as in claim 1 in which the gun is mounted in a guide in the band, the band supporting a ring bus bar and a rack engaged by an indexing head on the gun for traversing the gun a predetermined distance around the band after each welding operation.

6. Apparatus as in claim 3, said positioning means comprising a toothed or serrated edge on said band and means connected to said welding gun means and cooperating with said toothed edge to enable said welding gun means to be moved around said band.

References Cited

UNITED STATES PATENTS

| 1,096,506 | 5/1914 | Haskin | 219—160 |
| 2,153,785 | 4/1939 | Williams | 219—160 X |
| 2,353,868 | 7/1944 | Bisbee et al. | 219—160 X |
| 2,749,418 | 6/1956 | Mattson | 219—78 |
| 3,196,245 | 7/1965 | Nelson | 219—60 |

RICHARD M. WOOD, *Primary Examiner.*

B. A. STEIN, *Assistant Examiner.*

U.S. Cl. X.R.

219—160